No. 779,860. Patented January 10, 1905.

UNITED STATES PATENT OFFICE.

ARTHUR LÜTTRINGHAUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

VIOLET SULFUR DYE AND PROCESS OF MAKING SAME.

SPECIFICATION forming part of Letters Patent No. 779,860, dated January 10, 1905.

Application filed December 22, 1903. Serial No. 186,196.

*To all whom it may concern:*

Be it known that I, ARTHUR LÜTTRINGHAUS, a subject of the King of Prussia, Emperor of Germany, residing at Ludwigshafen-on-the-Rhine, in the Kingdom of Bavaria, Empire of Germany, have invented new and useful Improvements in Sulfur Coloring-Matters and Processes of Obtaining the Same, of which the following is a specification.

I have discovered that if equimolecular proportions of ortho-ortho-dichlor-para-phenylene-diamin and a phenol be oxidized together the reaction proceeds smoothly and there are obtained large quantities of new indophenols which are stable and which when treated with sulfur and alkali sulfid give rise to new sulfurized dyestuffs which have great coloring power and great affinity for cotton. The said new indophenols can be very easily reduced, and the resulting diphenylamin derivatives can be used instead of the corresponding indophenols in the preparation of the said new sulfurized dyestuffs.

As a matter of convenience I give an example of a method for preparing the intermediate indophenolic body which is used in the preparation of one of my new sulfur dyestuffs. The parts are by weight.

*Example 1—Preparation of indophenol from ortho-ortho-dichlor-para-phenylene-diamin and phenol.*—Seventy-five (75) parts of ortho-ortho-dichlor-para-phenylene-diamin are dissolved in thirty-five hundred (3,500) parts of water and three hundred and twenty (320) parts of hydrochloric acid, containing about thirty (30) per cent. of HCl. To this is added a solution of forty-two (42) parts of phenol in one thousand (1,000) parts of water, and the whole is cooled to zero centigrade, (0° C.,) and two thousand (2,000) parts of ice are added. This is stirred, and while stirring a solution of eighty (80) parts of bichromate in four hundred (400) parts of water is added all at once. After the further addition of a solution of one hundred and nine (109) parts of crystallized sodium acetate in four hundred (400) parts of water the indophenol is filtered off and well washed and pressed and dried.

The new indophenol is a fairly-stable body. For instance, it is only gradually decomposed after long standing with thirty (30) per cent. acetic acid. It is very easily reduced—for example, by an aqueous solution of sodium sulfid—to the corresponding diphenylamin which is obtained from its solutions in colorless crystals and dissolves readily in caustic-soda solution, yielding a colorless solution which in the air rapidly turns reddish blue, while the indophenol is gradually precipitated.

Instead of phenol in the above reaction other phenols, such as orthocresol or meta-cresol, can be employed.

The following example will serve to further illustrate the method by which my new dyestuffs may be obtained; but I do not confine my invention to this example. The parts are by weight.

*Example 2—Preparation of the sulfurized dyestuffs.*—Eighty (80) parts of the indophenol prepared according to example 1 from ortho-ortho-dichlor-para-phenylene-diamin and phenol are introduced into a solution of two hundred and forty (240) parts of crystallized sodium sulfid in two hundred and forty (240) parts of water. Forty (40) parts of sulfur are then added and the brown solution is evaporated in a vessel provided with a stirring apparatus till its temperature has risen to one hundred and twenty degrees centigrade, (120° C.) The vessel is then closed and fitted with a reflux condenser, and the contents of the vessel are heated until the indophenol has almost or entirely disappeared. The greenish-brown mass is then taken up with thirty-five hundred (3,500) parts of boiling water, and the solution is filtered, and air is passed through the filtrate, whereupon the dyestuff separates out as a dark powder and is filtered off and pressed and dried.

The dyestuff is practically insoluble in the usual organic solvents. It dissolves in concentrated sulfuric acid, the solution being blue. It dissolves in a small quantity of sodium sulfid, the solution being violet. In excess of sodium sulfid, however, similarly to the related indophenols it very easily undergoes reduction to the leuco compound. These sodium-sulfid solutions dye unmordanted cotton greenish-gray to bluish-gray shades, which on exposure to the air rapidly turn deep violet. A dyestuff of similar properties is obtained if in the above example instead of the indophenol the corresponding diphenylamin be substituted and also if either the indophenol or the diphenylamin be heated with alkali polysulfid to a higher temperature—for example, about one hundred and sixty degrees centigrade, (160° C.) In these cases the raw melt can be used directly for dyeing, or the dyestuff can be separated by dissolving the melt in water and passing air through the solution.

The same procedure is followed for the production of sulfurized dyestuffs from the other indophenols obtained according to example 1.

I claim—

The violet sulfur-containing coloring-matters which can be obtained from a dichlor-indophenol, which are dark powders soluble in sulfuric acid, yielding blue solutions, soluble in small quantities of sodium-sulfid solution yielding violet solutions, and when dissolved in excess of sodium-sulfid solution yield solutions which dye unmordanted cotton greenish-gray to bluish-gray shades, which shades on exposure to air turn deep violet.

In testimony whereof I have hereunto set my hand in the presence of two subscribing witnesses.

ARTHUR LÜTTRINGHAUS.

Witnesses:
JACOB ADRIAN,
T. ALEC. LLOYD.